(12) United States Patent
Zheng et al.

(10) Patent No.: US 10,335,708 B2
(45) Date of Patent: *Jul. 2, 2019

(54) SYSTEM AND METHOD TO GENERATE STEAM BY MIXING A FEED WATER STREAM WITH A HEATING MEDIUM

(71) Applicant: Cameron Solutions, Inc., Houston, TX (US)

(72) Inventors: Z. Frank Zheng, Cypress, TX (US); Christopher Stephen King, Houston, TX (US); Harihara V. Nemmara, Katy, TX (US)

(73) Assignee: Cameron Solutions, Inc., Houston, TX (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/193,813

(22) Filed: Jun. 27, 2016

(65) Prior Publication Data

US 2017/0370650 A1 Dec. 28, 2017

(51) Int. Cl.
*B01D 1/00* (2006.01)
*C02F 1/10* (2006.01)
*F22B 1/02* (2006.01)
*F16T 1/00* (2006.01)
*F28C 3/04* (2006.01)
(Continued)

(52) U.S. Cl.
CPC .............. *B01D 1/0041* (2013.01); *C02F 1/10* (2013.01); *F16T 1/00* (2013.01); *F22B 1/02* (2013.01); *B01D 1/28* (2013.01); *F28C 3/04* (2013.01); *F28D 2021/0064* (2013.01)

(58) Field of Classification Search
CPC .. B01D 1/0041; B01D 1/0064; B01D 1/0094; B01D 5/006; C02F 1/10; C02F 2103/08
See application file for complete search history.

(56) References Cited

U.S. PATENT DOCUMENTS 3,181,600 A 5/1965 Woodward et al.
8,652,304 B2 2/2014 Nazzer

FOREIGN PATENT DOCUMENTS

DE 2346609 3/1975
GB 1262458 2/1972
WO 2007073204 A1 6/2007

OTHER PUBLICATIONS

Perry's Chemical Engineer's Handbook, 2008, 8th ed., McGraw-Hill, p. 13-5.*

(Continued)

*Primary Examiner* — Renee Robinson
*Assistant Examiner* — Derek N Mueller
(74) *Attorney, Agent, or Firm* — Ronald G. Embry, Jr.

(57) ABSTRACT

A system and method to generate steam from a feed water stream does so in a liquid pool zone of a vessel as the stream comes into contact with a heating medium that is less volatile than the feed water stream. To keep the pool hot, the heating medium can be recirculated through a heater of a pump-around loop or a heater can be placed in the liquid pool. As the feed water stream is vaporized or partially vaporized, any solids or unvaporized water present in the feed water stream come out of the stream and move into the heating medium. These solids and the unvaporized water may be further removed from the heating medium in the pool or in the pump-around loop. The heat exchange surface does not contact the feed water to generate steam.

16 Claims, 2 Drawing Sheets

(51) Int. Cl.
 *B01D 1/28* (2006.01)
 *F28D 21/00* (2006.01)

(56) References Cited

OTHER PUBLICATIONS

GE, Water and Process Technology, 2012, (retrieved Mar. 30, 2018).*
Detlef Gille, Seawater intakes for desalination plants, 2003, Desalination, vol. 156, pp. 249-256.*

* cited by examiner

SYSTEM AND METHOD TO GENERATE STEAM BY MIXING A FEED WATER STREAM WITH A HEATING MEDIUM

BACKGROUND

This disclosure is in the field of steam generation processes and, more particularly, steam generation processes that do not rely upon a heat exchanging surface or pretreatment to meet feed water specifications.

Current steam generation processes that rely upon a heat exchanging surface are limited in their choice for a source of the feed water, and the feed water selected typically requires extensive pretreatment to meet the feed water specification. In some cases, the cost of pretreatment exceeds the cost of the steam generation depending on the source of the feed water.

Current steam generation processes are complicated, expensive, and typically require extensive water treatment to ensure the proper quality of the boiler feed water. In some cases, the cost of pretreatment exceeds the cost of the actual boiling processes. U.S. Pat. No. 8,652,304 B2 ("Nazzer") discloses a method of extracting dissolved or undissolved solids from a mixture of water and a process liquid or stream. The mixture is introduced into a mixing zone within or upstream of a separation vessel where it is further mixed with a recycle fluid extracted from a liquid pool zone of the separator vessel and pumped through a heat exchanger.

Vaporization occurs in this mixing zone (where more than 99% of the volatile components of the feed stream are vaporized). The resulting stream is then transferred to the separator vessel in which the vapor is separated, with the solid and liquid components falling into the liquid pool zone of the separator vessel. A portion of these solids and liquids that bond to these solids then passes through a stripping zone of the separator vessel. Water residing within the stripping zone displaces the liquids bound to the solids and an aqueous waste stream with dissolved or nondissolved solids results.

Because this method requires a mixing zone for vaporization outside of the liquid pool, the required equipment is difficult to design and prone to scaling and plugging. The method also does not allow for vaporization within the liquid pool and requires the heating medium—i.e., the recycle fluid, immiscible with the process stream and lighter than the water in the stripping zone—to be recycled at a rate of at least ten times that of the process feed rate. This high recycle rate is required because the method must limit the temperature difference between the recycle fluid and the process stream in order to avoid thermal degradation effects.

Last, the method requires a stripping zone for solids removal. A stripping zone is prone to corrosion because of unvaporized (solids) components from the process stream. The stripping zone also presents safety concerns due to the risk of higher temperature oil contacting water. To reduce the safety concern, the oil must be cooled before it touches the water in the stripping zone, but cooling the oil increases its viscosity and ineffective solids separation results.

SUMMARY

The present disclosure simplifies the system and method of generating steam from a feed water stream and reduces the cost of doing so.

Vaporization in a mixing zone outside of the liquid pool does not occur in embodiments of the system and method, nor do the system and method have a stripping zone for solids removal. The system and method is not limited to a light heating medium relative to the process stream but does have, in the case of a liquid containing blowdown, a heating medium that is immiscible with the process stream to enable liquid separation. Any pre-mixing of the feed water stream and heating medium may be done at a level below that required for vaporization (or partial vaporization) of the feed water stream. Pre-mixing may also be done to provide a relatively small amount of vaporization to enhance the pre-mixing and accelerate the fluid when it enters the liquid pool.

Embodiments of the system and method may disperse the feed water stream into a liquid pool containing a hot heating medium that is less volatile than the feed water stream. To keep the pool hot, the heating medium can be recirculated through a heater in a pump-around loop. Alternatively or additionally, a heater can be placed in the liquid pool.

As the feed water stream is vaporized, any dissolved or undissolved solids present in the feed water stream come out of the stream together with the unvaporized feed water (in partial vaporization) and move into the heating medium. The solids and unvaporized feed water that move into the heating medium may be further removed from the heating medium within the vessel or in a separator located in the pump-around loop. If the removal of the solids and unvaporized feed water occurs within the vessel, the vessel should include internals of a kind known in the art to the separate the unvaporized portion of the process or feed water stream from the heating medium. If the removal of the solids and unvaporized feed water occurs in a separator in the pump-around loop, the separator can be a hydrocyclone, centrifuge, particulate filter, settling tank, or some other piece of separation device equivalent to these.

Unlike prior art systems and methods, there is no requirement for pretreatment of the feed water stream or low temperature differentials between the vaporization temperature of the stream and heating medium (e.g., limited to 10° C. above the vaporization temperature due to the risk of scaling in the heat exchanger in the pump-around loop).

The embodiments of the disclosure may simplify the system and method to generate steam from a feed water stream; reduce the costs associated with prior art steam generation systems and processes; and eliminate the design and operational challenges presented by mixing zones located outside of the liquid pool zone of the vessel and stripping zones for solids removal. The disclosure eliminates the need for light heating mediums relative to the feed water stream and, in the case of total vaporization with a blowdown which contains the dissolved and undissolved solids portion of the feed water, eliminates the need for immiscible heating mediums. The disclosure also does not require the low temperature differential between the stream and heating medium or recycle rates of at least 10 times greater than that of the process feed.

The disclosure also reduces, and potentially eliminates, pretreatment for the feed water stream while at the same time minimizing or eliminating scaling and fouling of equipment. Because no heat exchanging surface is used directly in boiling, the disclosure can accommodate a wider range of feed water quality, thereby reducing the specifications for the feed water and allowing a much greater choice for the source of the feed water. Any pre-mixing of the feed water stream and the heating medium that occurs outside of the liquid pool zone may be done at a level below that at which the water vaporizes. Pre-mixing may also be done to provide a relatively small amount of vaporization to enhance the pre-mixing and accelerate the fluid when it enters the liquid pool.

BRIEF DESCRIPTION OF THE DRAWINGS

So that the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

ELEMENTS AND NUMBERING USED IN THE DRAWINGS AND DETAILED DESCRIPTION

Figure 1:
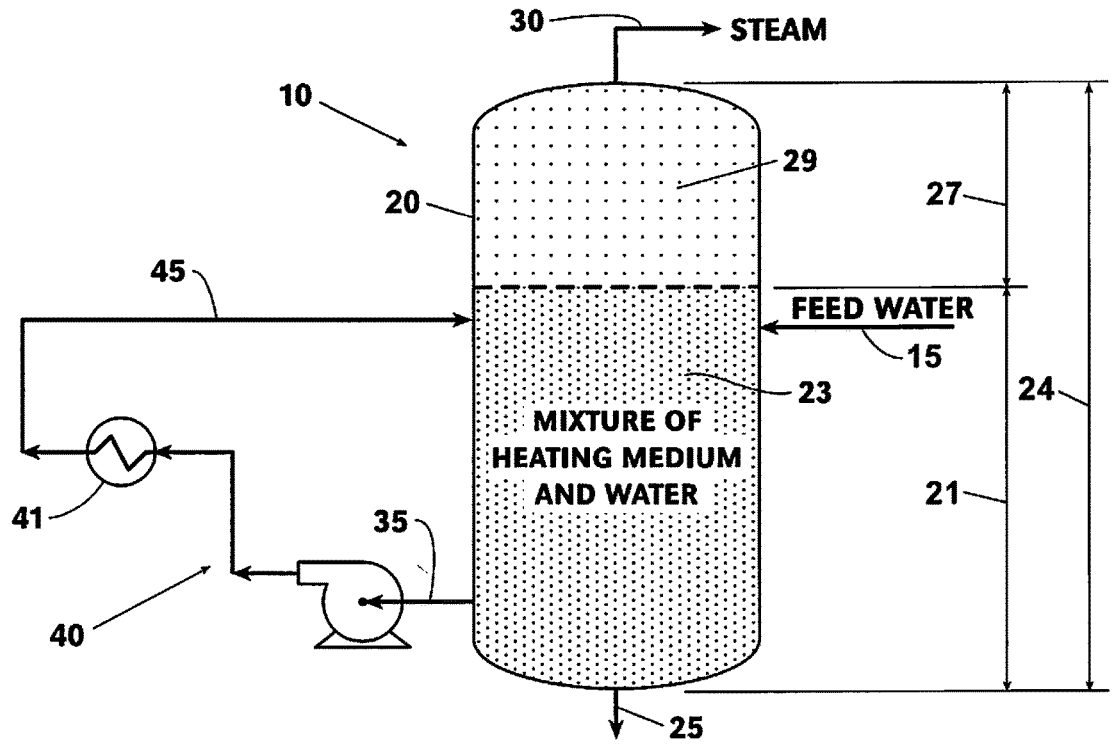
FIG. 1 is a schematic of an embodiment of a system and method to generate steam from a feed water stream. The feed water stream is routed to a heating medium pool of a vessel. Steam is generated as the water of feed water stream mixes with the heating medium and vaporizes or partially vaporizes. As the feed water vaporizes and turns into steam, dissolved solids may turn to undissolved solids. Undissolved solids along with unvaporized water (if any) move into the heating medium. The vessel includes internals to allow the separation of the solids and unvaporized water (if any) from the heating medium and remove the solids and unvaporized water (if any) from the vessel. A pump-around loop recycles the heating medium. If any pre-mixing of the process stream and heating medium occurs outside of the liquid pool (see FIG. 3), the pre-mixing may be at a level below that at which vaporization occurs. Pre-mixing may also be done to provide a relatively small amount of vaporization to enhance the pre-mixing and accelerate the fluid when it enters the liquid pool.

10 System or method
15 Feed water
17 Mixer within or outside of 20
20 Vessel
21 Liquid pool zone
23 Heating medium
24 Interior volume
25 Unvaporized (dissolved or undissolved solids components and any unvaporized water) portion of 15
27 Vapor separation zone
29 Vaporized (water) portion of 15
30 Steam
35 Removed heating medium stream or mixture (heating medium 23 and portion of 25)
40 Pump-around loop
41 Heater
45 Heated recycle stream substantially unvaporized portion-free or with a reduced unvaporized portion 25
47 Separator or separation device (such as a hydrocyclone, centrifuge, particulate filter, settling tank or their equivalents)
50 Heating medium stream substantially unvaporized portion-free or with a reduced unvaporized portion 25

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect", "connection", "connected", "in connection with", and "connecting" are used to mean "in direct connect with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream", "above" and "below", and other like terms indicated relative positions above or below a given point or element and are used in this description to more clearly describe some embodiments of the disclosure.

Embodiments of the system and method to generate steam eliminate the vaporization on the heat exchanging surface that drives existing feed water specifications. Therefore, a much wider choice for the source of (lower quality) feed water is allowed, including produced water and seawater sources. The system and method generate steam through vaporization (or partial vaporization) of the feed water stream when the stream contacts a heating medium residing in a liquid pool zone of a vessel. The vessel is arranged to directly receive the feed water stream, thereby eliminating pre-treatment between it and the upstream process providing the stream. A pump-around loop heats a portion of the heating medium and recycles this heated portion back to the vessel.

The heating medium, which can be lighter or heavier than the stream, is maintained at an operating temperature required for the desired steam generation effects. If any pre-mixing of the feed water and heating medium occurs outside of the liquid pool, the pre-mixing may be at a level below that at which vaporization occurs. Pre-mixing may also be done to provide a relatively small amount of vaporization to enhance the pre-mixing and accelerate the fluid when it enters the liquid pool. The vessel can also make use of blowdown to remove solids formed during the vaporization of the feed water stream, or any solids and unvaporized feed water. Blowdown, as used here, refers to the removal of solids or unvaporized feed water stream with concentrated levels of dissolved or undissolved solids. A separator located in the pump-around loop can be used for the separation of the blowdown.

Figure 2:
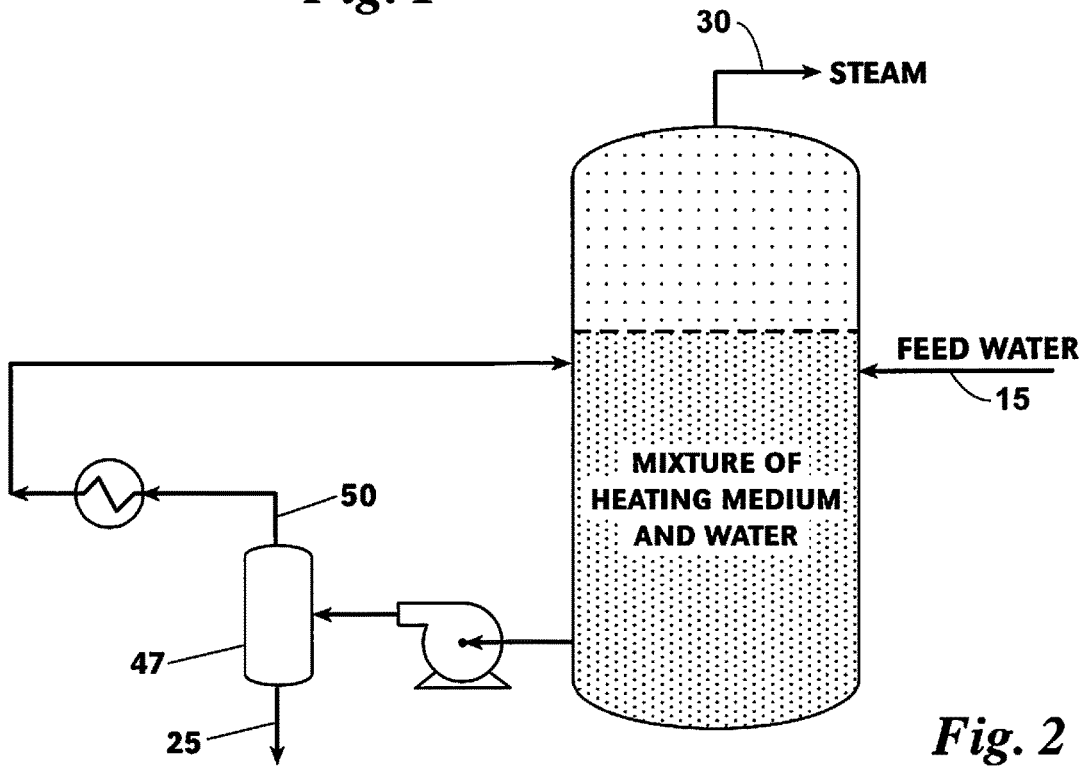
FIG. 2 is an embodiment of the system and method. The pump-around loop includes a separator for removing solids alone or in combination with any unvaporized water of the feed water stream. The separator can be a hydrocyclone, centrifuge, particulate filter, settling tank, or some other piece of separation device equivalent to these.
Figure 3:
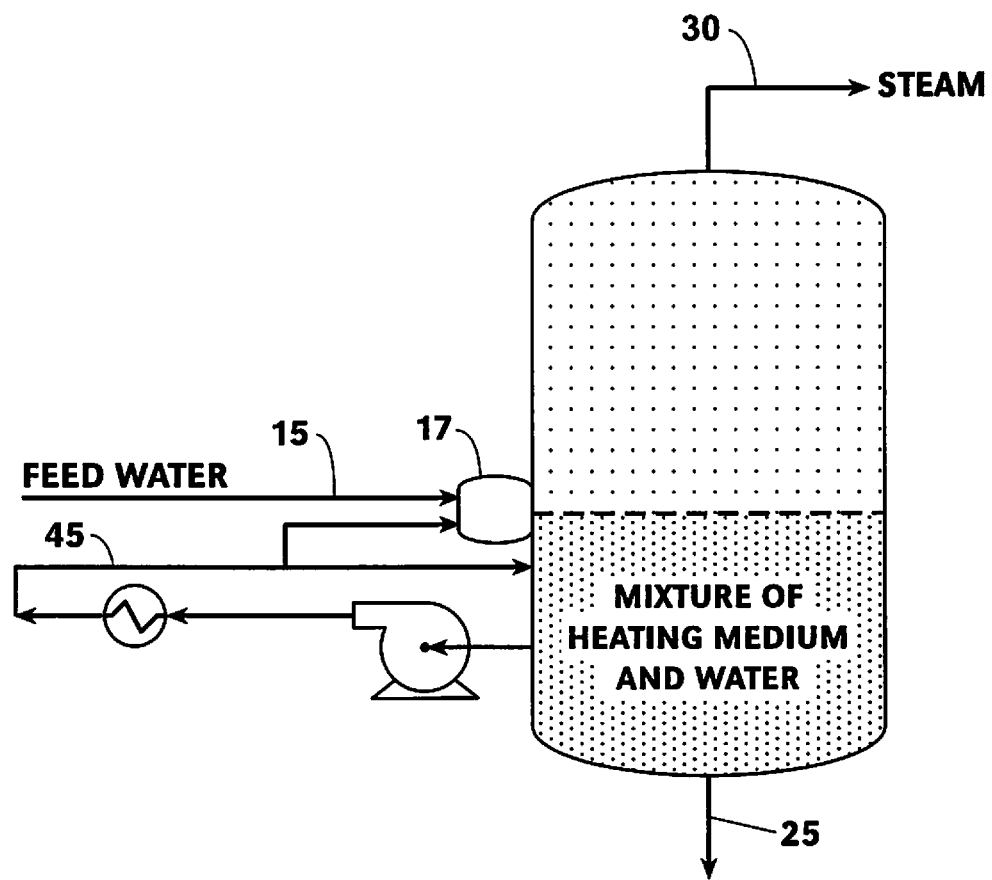
FIG. 3 is an embodiment of the system and method. Pre-mixing of the feed water stream and heating medium occurs outside of the liquid pool zone of the vessel but at a level below that needed for vaporization. Pre-mixing may also be done to provide a relatively small amount of vaporization to enhance the pre-mixing and accelerate the fluid when it enters the liquid pool.

The different arrangements of the system and method 10 as shown in FIGS. 1 to 3 route a feed water stream 15 into a vessel 20 whose interior volume 24 is defined by a liquid pool zone 21 and a vapor separation zone 27. A heating medium 23 resides within the liquid pool zone 21 and this heating medium 23 is used to vaporize or partially vaporize the volatile components 29 of the feed water stream 15. Mixing of the feed water stream 15 and heating medium 23 occurs naturally within the liquid pool zone 21 as the feed water stream 15 enters the zone 21.

The now vaporized portions 29 of the feed water stream 15 migrate to a vapor separation zone 27 of the vessel 20 and are removed as steam 30.

As the volatile components 29 of the feed water stream 15 vaporize, the unvaporized portion 25 of the feed water stream 15 moves into the liquid pool zone 21 along with the heating medium 23. Because the unvaporized portion 25 is solids, or if any liquid, immiscible with the heating medium 23, that portion can be separated from the heating medium 23 either within the vessel 20 or within a separator 47 located in the pump-around loop 40. The unvaporized portion 25, both liquid and undissolved solids, can be removed as blowdown stream 25. No stripping zone is used.

The separator 47 used in the pump-around loop 40 can be any separator suitable, including but not limited to a hydrocyclone, centrifuge, particulate filter, settling tank, or some other piece of separation device equivalent to these. A heating medium stream 50 with reduced amounts of, or without, unvaporized solids or liquids 25 exits the separator 47 and passes through the heater 41. The heated recycle stream 45 then recycles back to the liquid pool zone 21 of the vessel 20. The heated recycle stream 45 may include some portion of the unvaporized solids and liquids 25 of the process stream 15.

The heating medium 23 is maintained at an operating temperature that provides the desired vaporization effects. The heating medium 23 can be any heating medium depending on the make-up of feed water stream 15 and application-specific requirements. For example, the heating medium 23 could be one that one that is lighter than, heavier than, or (in the case of total vaporization of the water) the same density as the feed water stream 15. The heating medium 23 could also be one that forms, in the case of total vaporization, a homogeneous or heterogeneous mixture with the feed water stream 15. However, in the case of partial vaporization in which there is unvaporized water in the unvaporized portion 25, the heating medium 23 is immiscible with the feed water stream 15 to form a heterogeneous mixture. In either case, the heating medium 23 is less volatile than the water of the feed water stream 15.

To keep the heating medium 23 at the selected operating temperature, a heater (not shown) can be placed in the liquid pool zone 21. Alternatively or additionally, a removed stream 35 of the heating medium 23, which may include unvaporized portion 25 residing within the liquid pool zone 21, can be removed from the vessel 20 and routed to the pump-around loop 40 and its heater 41. A heated recycle stream 45, that may include solids and unvaporized water from 25, then recycles back to the liquid pool zone 21.

An embodiment of a method to generate steam includes: routing the feed water stream 15 directly into the liquid pool zone 21 of the vessel 20 where it becomes mixed with a heating medium 23 that is less volatile than the feed water stream 15 and maintained at an operating temperature determined by vaporization requirements to vaporize a volatile components portion 29 of the feed water stream 15; and removing the vaporized portion 29 of the process stream 15 from the vapor separation zone 27 of the vessel 20 as steam 30.

Prior to the feed water stream 15 entering the liquid pool zone 21 there may be no pre-treatment of the stream 15 as it exits the upstream process providing the stream 15 and there may be no mixing of the process stream 15 with the heating medium 23. Pretreatment means treatment such as but not limited to chemical dosing, filtration using selectively permeable membranes, separators, or the use of ion exchange, deaerators or blowdown prior to the feed water stream 15 entering vessel 20 (or some combination of the above pretreatment methods). (Coarse straining of a kind known in the art and typically done ahead of pretreatment might be used if the feed is a taken directly from a natural body of water or from a source with excessive undissolved solids.) If any pre-mixing of the feed water stream 15 and heating medium 23 occurs outside of the liquid pool zone 21 (see e.g. mixer 17 in FIG. 3), the pre-mixing may be done at a level below that at which vaporization occurs. Therefore, vaporization of the feed water stream 15 occurs within the liquid pool zone 21 of the vessel 20.

Pre-mixing may also be done to provide a relatively small amount of vaporization to enhance the pre-mixing and accelerate the fluid 15 when it enters the liquid pool 21. The amount of vaporization that occurs may be less than that which occurs in the liquid pool. For example, during normal (non-turndown) operations no more than 20% or about 5% of the volatile components in the stream 15 may vaporize during pre-mixing. If the amount of vaporization does exceed that of the liquid pool, during normal operations vaporization during pre-mixing should not exceed about 80% or about 90% of the volatile components. Limiting the amount of vaporization during pre-mixing helps avoid the design challenges and scaling and plugging problems associated with the mixing zone of the prior art (see Background).

The heating medium 23 and process stream 15 can form a heterogeneous or homogeneous mixture (in the case of total or partial vaporization of water) or a heterogeneous mixture (in the case of partial vaporization of water) when residing within the liquid pool zone 21. Additionally, the density of the heating medium 23 can be greater than, less than, or equal to (in the case of total vaporization) that of the process stream 15.

The method can also include removing a portion 35 of the heating medium 23 residing in the liquid pool zone 21 of the vessel 20; raising a temperature of the removed portion or stream 35 to produce a heated recycle stream 45; and routing the heated recycle stream 45 back to the liquid pool zone 21. The removed stream 35 can also be routed to a separator 47 to produce heating medium stream 50 substantially unvaporized portion-free or a reduced unvaporized portion 25. Once stream 50 is heated by heater 41, it can be returned to the liquid pool zone 21 as the heated recycled stream 45.

An embodiment of a system to generate steam includes a vessel 20 arranged to contact a feed water stream 15 exiting an upstream process and route the feed water stream 15 into a heating medium 23 residing within the liquid pool zone 21 of the vessel 20. The interior volume 24 of the vessel 20 does not include a stripping zone for the removal of unvaporized portion 25. The volatile components 29 of the feed water stream 15 migrate to the vapor separation zone 27 of the vessel 20.

A pump-around loop 40 is arranged to receive a portion 35 of the mixed heating medium 23 along with the non-volatile (dissolved and undissolved) components and unvaporized water 25 of the feed water stream 15 that have moved into the heating medium 23 and then return the portion 35 back to the liquid pool zone 21 as a heated recycle stream 45. The pump-around loop 40 of the system can also include a heater 41 as well as a separator 47 arranged upstream of the heater 41 so that a substantially unvaporized portion-free or reduced unvaporized portion stream 45 is being returned to the vessel 20.

Prior to contacting the heating medium 23, the feed water stream 15 may not be mixed with the heating medium 23 outside of the liquid pool zone 21 of the vessel 20. If any pre-mixing of the stream 15 and heating medium 23 occurs, the mixing may be at a level below that required for vaporization of the volatile components 29. Pre-mixing may also be done to provide a relatively small amount of vaporization to enhance the pre-mixing and accelerate the fluid when it enters the liquid pool 21.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed:

1. A method to generate steam from a feed water stream, the method comprising:
   routing the feed water stream into a liquid pool zone of a vessel, the liquid pool zone including a heating medium, the heating medium being less volatile than the feed water stream and maintained at an operating temperature determined by vaporization requirements;
   pre-mixing the feed water stream and the heating medium outside of the liquid pool zone of the vessel;
   vaporizing at least a portion of the feed water stream due to contact with the heating medium in the liquid pool zone;
   removing a vaporized portion of the feed water stream from a vapor separation zone of the vessel as steam; and
   removing solids from the liquid pool zone of the vessel.

2. A method according to claim 1 wherein during pre-mixing no vaporization of the water components of the feed water stream occurs.

3. A method according to claim 1 wherein during pre-mixing no more than about 90% of the volatile components of the process stream vaporize.

4. A method according to claim 1 further comprising separating and removing at least some of the solids from the vessel directly as blowdown containing the at least some of the solids.

5. A method according to claim 1 further comprising:
   removing a portion of the heating medium residing in the liquid pool zone of the vessel;
   raising a temperature of the removed portion to produce a heated recycle stream; and
   routing the heated recycle stream back to the liquid pool zone.

6. A method according to claim 5 wherein the removed portion of the heating medium is a mixture of heating medium and at least some of the solids of the feed water stream.

7. A method according to claim 5 further comprising separating and removing at least some of the solids from the mixture prior to raising the temperature.

8. A method according to claim 1 wherein a density of the heating medium is greater than that of the feed water stream.

9. A method according to claim 1 wherein the feed water stream is not pre-treated prior to entering the liquid pool zone of the vessel.

10. A method according to claim 1 further comprising filtering the feed water stream by straining prior to the feed water stream entering the liquid pool zone of the vessel.

11. A system to generate steam from a feed water stream, the system comprising:
    a vessel arranged to receive a feed water stream into a liquid pool zone of the vessel, the liquid pool zone including a heating medium less volatile than the feed stream and maintained at an operating temperature determined by vaporization requirements;
    a mixer located outside of the liquid pool zone of the vessel and arranged to mix the feed water stream and the heating medium; and
    a pump-around loop arranged to receive a portion of the heating medium residing in the liquid pool zone and return the portion back to the liquid pool zone;
    wherein when the feed water stream is contacted by the heating medium in the liquid pool zone at least a portion of the water of the feed water stream vaporizes and migrates to a vapor separation zone of the vessel for removal and solids form in the liquid pool zone of the vessel for removal.

12. A system according to claim 11 wherein the mixer is arranged so no vaporization of the volatile components of the feed water stream occurs in the mixer.

13. A system according to claim 11 wherein the mixer is arranged so no more than about 90% of the volatile components of the feed water stream vaporize in the mixer.

14. A system according to claim 11 wherein the vessel includes internals arranged to separate at least some of the solids of the feed water stream from the heating medium.

15. A system according to claim 11 further comprising the pump-around loop including a heater.

16. A system according to claim 11 further comprising the pump-around loop including a separation device.

* * * * *